(12) United States Patent
Xing et al.

(10) Patent No.: US 10,897,620 B2
(45) Date of Patent: Jan. 19, 2021

(54) METHOD AND APPARATUS FOR PROCESSING A VIDEO

(71) Applicant: BEIJING BAIDU NETCOM SCIENCE AND TECHNOLOGY CO., LTD., Beijing (CN)

(72) Inventors: Huaifei Xing, Beijing (CN); Jialiang Wang, Beijing (CN); Huifeng Shen, Beijing (CN); Feifei Cao, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/567,976

(22) Filed: Sep. 11, 2019

(65) Prior Publication Data

US 2020/0195934 A1 Jun. 18, 2020

(30) Foreign Application Priority Data

Dec. 14, 2018 (CN) .......................... 2018 1 1536277

(51) Int. Cl.
| | |
|---|---|
| *H04N 19/154* | (2014.01) |
| *H04N 19/14* | (2014.01) |
| *G06K 9/00* | (2006.01) |

(52) U.S. Cl.
CPC ....... *H04N 19/154* (2014.11); *G06K 9/00744* (2013.01); *G06K 9/00765* (2013.01); *H04N 19/14* (2014.11)

(58) Field of Classification Search
CPC .......... G06K 9/00711; G06K 9/00765; G06K 9/00744; G06N 3/08; H04N 19/154; H04N 19/14
See application file for complete search history.

(56) References Cited

U.S. PATENT DOCUMENTS

| | | | |
|---|---|---|---|
| 2012/0155553 A1 | 6/2012 | Liao et al. | |
| 2017/0132498 A1* | 5/2017 | Cohen | .................. G06N 3/08 |
| 2017/0359580 A1* | 12/2017 | Su | .................. H04N 19/179 |
| 2018/0295371 A1 | 10/2018 | Jiang et al. | |
| 2019/0075299 A1* | 3/2019 | Sethuraman | ....... G06K 9/00711 |

FOREIGN PATENT DOCUMENTS

| | | |
|---|---|---|
| CN | 103780901 A | 5/2014 |
| CN | 108174290 A | 6/2018 |
| JP | 2002142218 | 5/2002 |
| WO | 2015/183910 A1 | 12/2015 |

\* cited by examiner

*Primary Examiner* — Tracy Y. Li
(74) *Attorney, Agent, or Firm* — Knobbe, Martens, Olson & Bear LLP (57) ABSTRACT

Embodiments of the present disclosure relate to a method and apparatus for processing a video. The method can include: acquiring a to-be-processed video, and dividing the video into at least one video segment according to a scene; for a video segment of the at least one video segment, extracting a feature of the video segment; inputting the feature and a target video quality into a pre-trained encoding parameter prediction model, to obtain an encoding parameter of the video segment, the encoding parameter prediction model being used to represent a corresponding relationship between the feature of the video segment and the encoding parameter under the target video quality; and performing an encoding process on the video according to the encoding parameter corresponding to the video segment of the at least one video segment, to generate an encoded video.

11 Claims, 6 Drawing Sheets

METHOD AND APPARATUS FOR PROCESSING A VIDEO

CROSS-REFERENCE TO RELATED APPLICATIONS

This application claims priority to Chinese Application No. 201811536277.0, filed on Dec. 14, 2018 and entitled "Method and Apparatus for Processing a Video," the entire disclosure of which is hereby incorporated by reference.

TECHNICAL FIELD

Embodiments of the present disclosure relate to the field of computer technology, and specifically to a method and apparatus for processing a video.

BACKGROUND

Video transcoding is to convert a compressed and encoded video bit stream into another kind of video bit stream, to adapt to different network bandwidths, different terminal processing capabilities, or different user requirements.

The related content adaptive encoding technology basically uses the method of encoding many times. That is, the complexity factor of an entire video is first calculated using CRF (constant rate factor, guaranteeing a certain quality to intelligently allocate a bit rate) encoding, and then an encoding parameter of the entire video is adjusted. That is, the basis of the content adaptation is the level of a segment (title).

However, for video contents of different lengths, the scenes inside may be variable, and a different scene means a finer granular precision of the content adaptation.

SUMMARY

Embodiments of the present disclosure propose a method and apparatus for processing a video.

In a first aspect, some embodiments of the present disclosure provide a method for processing a video. The method includes: acquiring a to-be-processed video, and dividing the video into at least one video segment according to a scene; for a video segment of the at least one video segment, extracting a feature of the video segment; inputting the feature and a target video quality into a pre-trained encoding parameter prediction model, to obtain an encoding parameter of the video segment, the encoding parameter prediction model being used to represent a corresponding relationship between the feature of the video segment and the encoding parameter under the target video quality; and performing an encoding process on the video according to the encoding parameter corresponding to the video segment of the at least one video segment, to generate an encoded video.

In some embodiments, the method further includes: determining a video quality of the encoded video; and outputting, in response to the determined video quality not matching the target video quality, predetermined information.

In some embodiments, the extracting a feature of the video segment includes: decoding the video segment, to extract a time domain feature and/or a frequency domain feature of the video segment.

In some embodiments, the encoding parameter prediction model is trained and obtained by: acquiring a sample video set, and annotating an encoding parameter and a video quality of a sample video in the sample video set; extracting, for the sample video in the sample video set, a feature of the sample video, and determining a complexity factor of the sample video according to the feature of the sample video; classifying the sample video in the sample video set into at least one category according to the complexity factor; and performing, for a category of the at least one category, a regression on an encoding parameter and a video quality of a sample video belonging to the category, to obtain a relationship curve between the encoding parameter and the video quality.

In some embodiments, the annotating an encoding parameter and a video quality of a sample video in the sample video set includes: encoding, for the sample video in the sample video set, the sample video according to a predetermined constant quality value, and annotating the encoding parameter and the video quality during the encoding.

In some embodiments, the complexity factor is related to a pixel depth of the encoded sample video.

In a second aspect, some embodiments of the present disclosure provide an apparatus for processing a video. The apparatus includes: a dividing unit, configured to acquire a to-be-processed video, and divide the video into at least one video segment according to a scene; an extracting unit, configured to extract, for a video segment of the at least one video segment, a feature of the video segment; an inputting unit, configured to input the feature and a target video quality into a pre-trained encoding parameter prediction model, to obtain an encoding parameter of the video segment, the encoding parameter prediction model being used to represent a corresponding relationship between the feature of the video segment and the encoding parameter under the target video quality; and a processing unit, configured to perform an encoding process on the video according to the encoding parameter corresponding to the video segment of the at least one video segment, to generate an encoded video.

In some embodiments, the apparatus further includes a verifying unit. The verifying unit is configured to: determine a video quality of the encoded video; and output, in response to the determined video quality not matching the target video quality, predetermined information.

In some embodiments, the extracting unit is further configured to: decode the video segment, to extract a time domain feature and/or a frequency domain feature of the video segment.

In some embodiments, the apparatus further includes a training unit. The training unit is configured to: acquire a sample video set, and annotate an encoding parameter and a video quality of a sample video in the sample video set; extract, for the sample video in the sample video set, a feature of the sample video, and determine a complexity factor of the sample video according to the feature of the sample video; classify the sample video in the sample video set into at least one category according to the complexity factor; and perform, for a category of the at least one category, a regression on an encoding parameter and a video quality of a sample video belonging to the category, to obtain a relationship curve between the encoding parameter and the video quality.

In some embodiments, the training unit is further configured to: encode, for the sample video in the sample video set, the sample video according to a predetermined constant quality value, and annotate the encoding parameter and the video quality during the encoding.

In some embodiments, the complexity factor is related to a pixel depth of the encoded sample video.

In a third aspect, some embodiments of the present disclosure provide an electronic device. The electronic device includes: one or more processors; and a storage device, configured to store one or more programs. The one or more programs, when executed by the one or more processors, cause the one or more processors to implement the method described in any embodiment in the first aspect.

In a fourth aspect, some embodiments of the present disclosure provide a computer readable medium storing a computer program. The program, when executed by a processor, implements the method described in any embodiment in the first aspect.

According to the method and apparatus for processing a video provided by some embodiments of the present disclosure, the video is divided into the segment according to the scene, and the encoding parameter under the target video quality is predicted through the encoding parameter prediction model obtained through machine learning. According to this embodiment, the content adaptive encoding is performed on the video according to the predicted encoding parameter. Thus, a compression ratio may be improved and the video quality may be improved.

BRIEF DESCRIPTION OF THE DRAWINGS

After reading detailed descriptions of non-limiting embodiments given with reference to the following accompanying drawings, other features, objectives and advantages of the present disclosure will be more apparent.

DETAILED DESCRIPTION OF EMBODIMENTS

Embodiments of present disclosure will be described below in detail by combining the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and some features in the disclosure may be combined with each other on a non-conflict basis. Features of the present disclosure will be described below in detail with reference to the accompanying drawings and in combination with embodiments.

Figure 1:
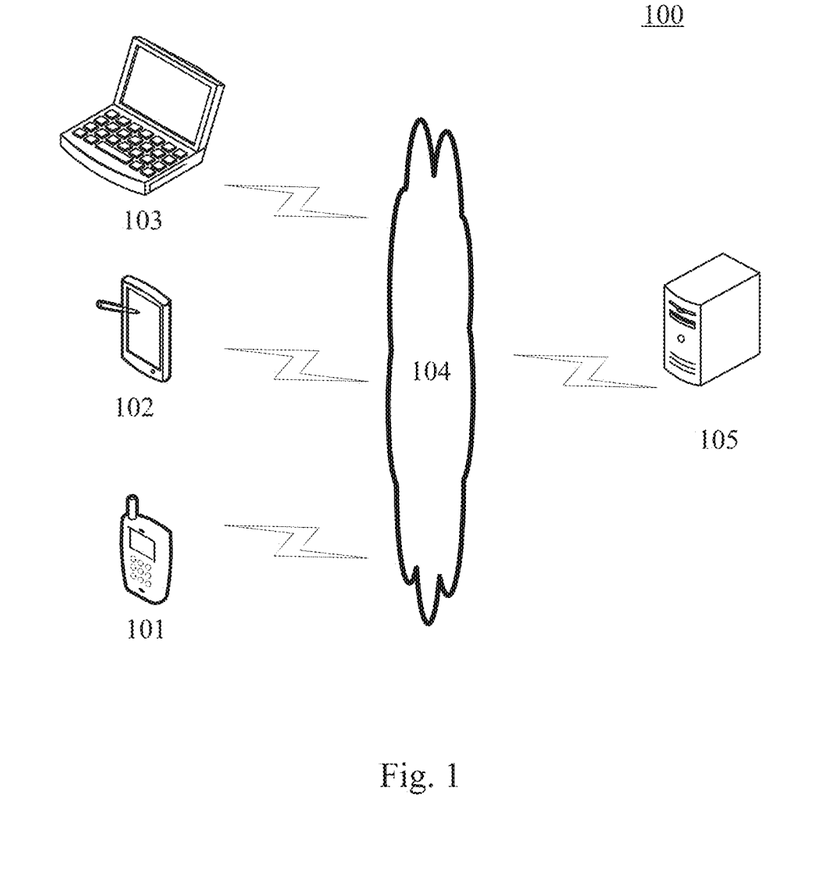
FIG. 1 is a diagram of an example system architecture in which an embodiment of the present disclosure may be implemented.

FIG. 1 shows an example system architecture 100 in which a method for processing a video or an apparatus for processing a video according to an embodiment of the present disclosure may be implemented.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, for example, wired or wireless communication links, or optical fiber cables.

A user may interact with the server 105 via the network 104 by using the terminal devices 101, 102 and 103, to receive or send messages. Various client applications (e.g., a webpage browser application, a video player, a search application, an instant communication tool, a mailbox client, and social platform software) may be installed on the terminal devices 101, 102 and 103.

The terminal devices 101, 102 and 103 may be hardware or software. When being the hardware, the terminal devices 101, 102 and 103 may be various electronic devices having a display screen and supporting webpage browsing, the electronic devices including, but not limited to, a smart phone, a tablet computer, an e-book reader, an MP3 player (moving picture experts group audio layer III), an MP4 (moving picture experts group audio layer IV) player, a laptop portable computer and a desktop computer. When being the software, the terminal devices 101, 102 and 103 may be installed in the above-listed electronic devices. The terminal devices may be implemented as a plurality of pieces of software or a plurality of software modules (e.g., software or software modules for providing a distributed service), or as a single piece of software or a single software module, which will not be specifically defined here.

The server 105 may be a server providing various kinds of services, for example, a video processing server processing a video displayed on the terminal devices 101, 102 and 103. The video processing server may perform processing such as an analysis on data such as a received to-be-transcoded video, and feed back the processing result (e.g., the transcoded video segment) to the terminal devices.

It should be noted that the server may be hardware or software. When being the hardware, the server may be implemented as a distributed server cluster composed of a plurality of servers, or as a single server. When being the software, the server may be implemented as a plurality of pieces of software or a plurality of software modules (e.g., software or software modules for providing a distributed service), or as a single piece of software or a single software module, which will not be specifically defined here.

It should be noted that the method for processing a video provided by some embodiments of the present disclosure is generally performed by the server 105. Correspondingly, the apparatus for processing a video is generally provided in the server 105.

It should be appreciated that the numbers of the terminal devices, the networks, and the servers in FIG. 1 are merely illustrative. Any number of terminal devices, networks and servers may be provided based on actual requirements.

Figure 2:
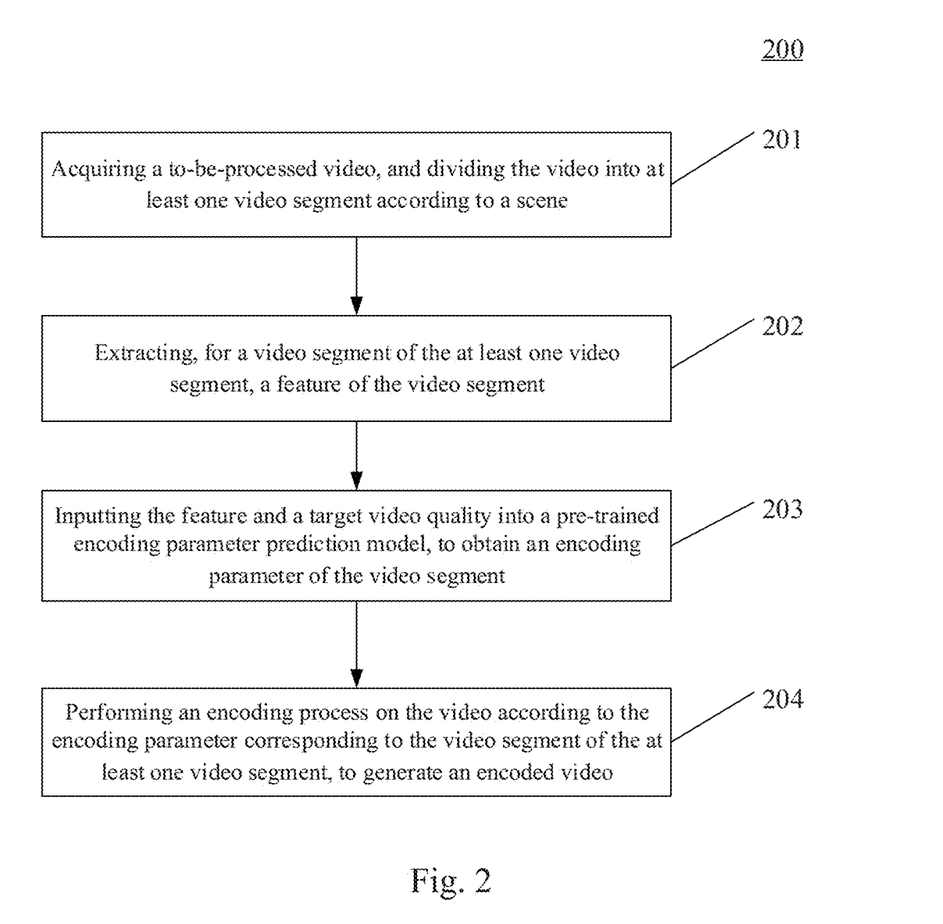
FIG. 2 is a flowchart of a method for processing a video according to an embodiment of the present disclosure.

Further referring to FIG. 2, FIG. 2 illustrates a flow 200 of a method for processing a video according to an embodiment of the present disclosure. The method for processing a video includes the following steps.

Step 201, acquiring a to-be-processed video, and dividing the video into at least one video segment according to a scene.

In this embodiment, an electronic device (e.g., the server shown in FIG. 1) on which the method for processing a video is performed may acquire the to-be-processed (i.e., to-be-transcoded) video by means of a wired or wireless connection, and divide the to-be-processed video into the at least one video segment according to the scene. In the scene-based segmentation method, there are many well-known techniques, for example, a threshold is fixed by using a standard deviation or a mean square deviation value between frames as an index. When being greater than the threshold, the index may be used as the boundary for segmenting a scene. A so-called scene may be considered as being within a scene, and shots in the scene are continuously transformed. Thus, it is considered that the complexities are consistent.

Step 202, extracting, for a video segment of the at least one video segment, a feature of the video segment.

In this embodiment, according to the scene that is a basic unit of segment transcoding, the video in the scene is decoded to extract a feature of the video in the time domain or frequency domain. The feature may include motion information between adjacent frames, VIF (visual information fidelity), a DLM (detail loss measure), etc.

A complexity factor of the video may be determined according to the feature of the video, so as to classify the video. For each segment of the scene, CRF transcoding is performed according to a given constant quality value, and a mean BPP (bits per pixel, i.e., pixel depth) of all frames of the segment is statisticized after the transcoding. Then, a certain mathematical operation (e.g., Log 10) is performed on the value of the BPP, and the value is scaled to a certain range to be used as the complexity coefficient of the video. The mean value of the video complexity coefficients of all video segments in the video is statisticized as a mean complexity coefficient, and then the complexity factor of each video segment is calculated as follows.

Complexity factor=complexity coefficient/(mean complexity coefficient).

Step 203, inputting the feature and a target video quality into a pre-trained encoding parameter prediction model, to obtain an encoding parameter of the video segment.

In this embodiment, the encoding parameter prediction model may be a deep neural network predictor. The encoding parameter prediction model is used to represent a corresponding relationship between the feature of the video segment and the encoding parameter under the target video quality. Specifically, as an example, the encoding parameter prediction model may be a corresponding relationship table pre-established by a technician based on statistics on a large number of features and encoding parameters for representing different video qualities, and storing a plurality of corresponding relationships between the features and the encoding parameters for representing the different video qualities. Alternatively, the encoding parameter prediction model may be a regression curve preset based on statistics on a large amount of data and stored into the electronic device by the technician, and obtained by performing a regression on one ore more values of the encoding parameters under the different video qualities. Different regression curves may be queried according to the category of the complexity factor determined according to the feature of the video, and each regression curve represents encoding parameters of a video of a complexity factor under different video qualities. The encoding parameters may include a bit rate, a resolution, a CRF, or the like.

The quality of the video may be represented by a PSNR (Peak Signal to Noise Ratio), a VMAF (multi method visual multimethod assessment fusion), or a MOS (mean opinion score). The target video quality refers to a video quality expected by a user.

Step 204, performing an encoding process on the video according to the encoding parameter corresponding to the video segment of the at least one video segment, to generate an encoded video.

In this embodiment, for different video segments, different encoding approaches may be used. The video segments are respectively encoded using corresponding encoding approach, and then combined into a complete video.

In some alternative implementations of this embodiment, the method further comprising: determining a video quality of the encoded video. In response to the determined video quality not matching the target video quality, predetermined information is outputted. A predicted encoding parameter is verified to avoid an undesirable result due to the inaccuracy of the encoding parameter prediction model. The predetermined information may be information for prompting that the quality of the encoded video does not reach the target video quality.

Figure 3:
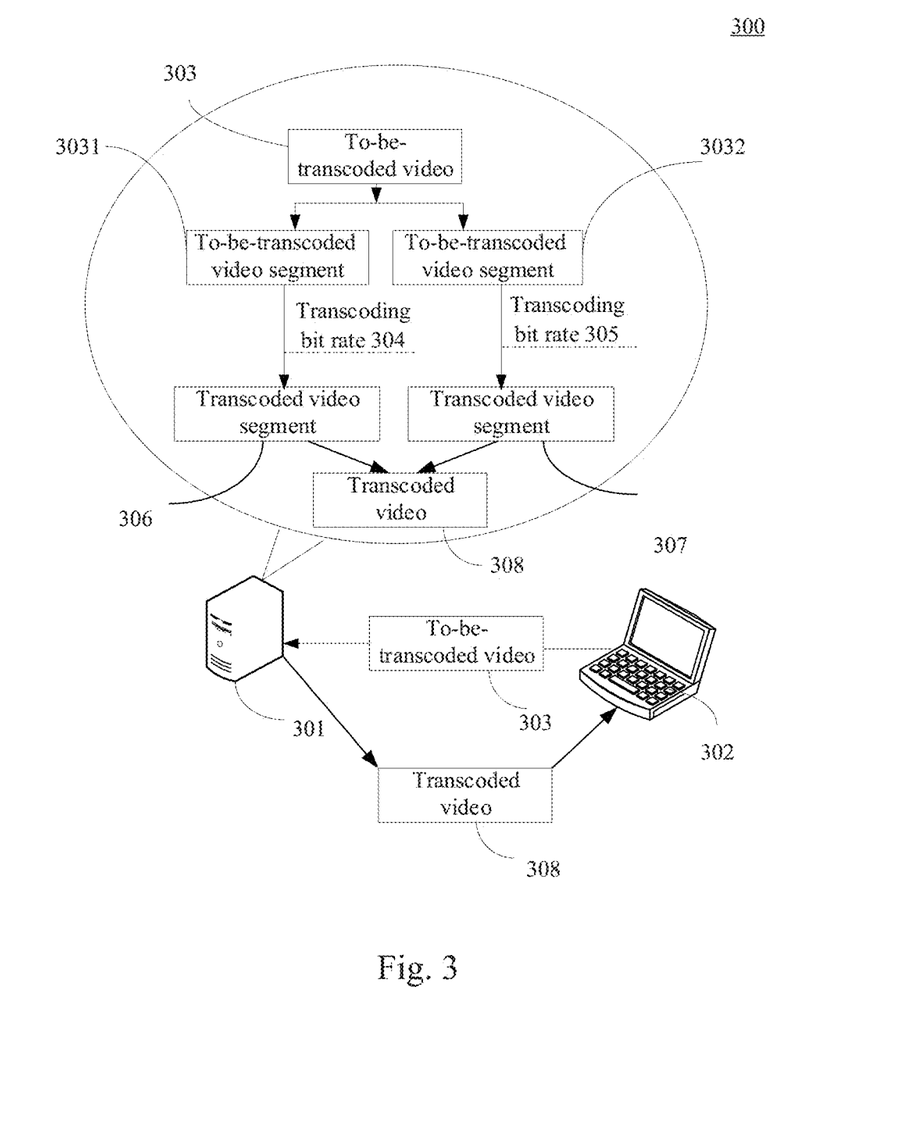
FIG. 3 is a schematic diagram of an application scenario of the method for processing a video according to an embodiment of the present disclosure.

Further referring to FIG. 3, FIG. 3 is a schematic diagram of an application scenario of the method for processing a video according to this embodiment. In the application scenario of FIG. 3, the server 301 may first acquire the to-be-transcoded video 303 sent by the terminal device 302, and divide the to-be-transcoded video 303 into two to-be-transcoded video segments 3031 and 3032 according to the scene. Then, for the to-be-transcoded video segment 3031 and the to-be-transcoded video segment 3032, the server 301 may perform: determining respectively a feature of the to-be-transcoded video segment 3031 and a feature of the to-be-transcoded video segment 3032. The generated features are respectively inputted into the pre-trained encoding parameter prediction model, and the target video quality is inputted at the same time, to obtain the optimal encoding parameter of the to-be-transcoded video segment 3031 under the target video quality and the optimal encoding parameter of the to-be-transcoded video segment 3032 under the target video quality. Then, based on the obtained encoding parameters, the server 301 may determine the transcoding bit rate 304 of the to-be-transcoded video segment 3031 and the transcoding bit rate 305 of the to-be-transcoded video segment 3032. Finally, the server 301 may respectively transcode the to-be-transcoded video segments 3031 and 3032 based on the determined transcoding bit rates 304 and 305, to generate the transcoded video segments 306 and 307. Then, the video segments 306 and 307 are combined into the transcoded video 308 and then returned to the terminal device 302.

According to the method provided in some embodiments of the present disclosure, the to-be-transcoded video is divided into the video segments according to the scene. Then, the video segments are respectively inputted into the pre-trained encoding parameter prediction model, to obtain the encoding parameters of different video segments. Next, the video segments are encoded according to their respective encoding parameters, and then combined into the encoded video. It is implemented that the encoding parameter is set based on the complexity of the content, thus reaching the purpose of improving the encoding compression efficiency and improving the video quality.

Figure 4:
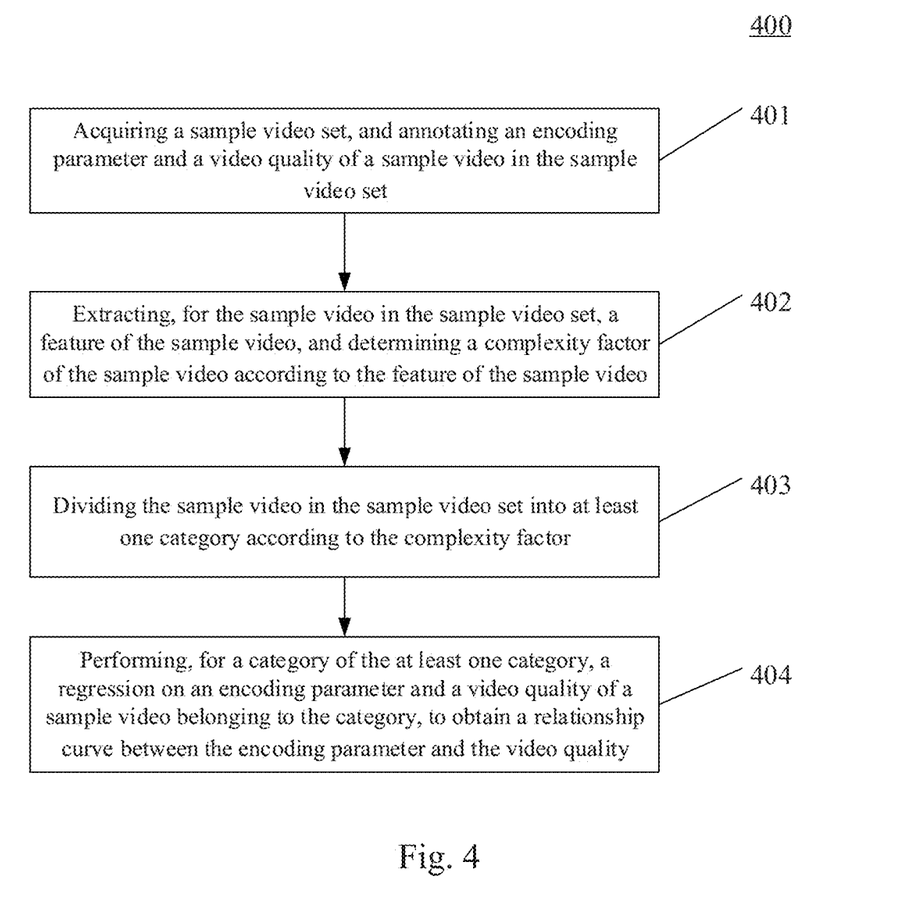
FIG. 4 is a flowchart of the method for processing a video according to another embodiment of the present disclosure.

Further referring to FIG. 4, FIG. 4 illustrates a flow 400 of another embodiment of the method for processing a video. The flow 400 of the method for processing a video includes the following steps.

Step 401, acquiring a sample video set, and annotating an encoding parameter and a video quality of a sample video in the sample video set.

In this embodiment, an electronic device (e.g., the server shown in FIG. 1) on which the method for processing a video is performed may acquire, from a third party server, the sample video set by means of a wired or wireless connection. The sample video may be a specified test sequence, and each test sequence represents a different space complexity (SI, spatial perceptual information) and a different time complexity (TI, temporal perceptual Information). The calculation method for TI and SI is recommended in the international standard ITU-T P. 910.

The construction of the sample video set may be from an open data set; or may be from an actual on-line video data set. The data sets are from different categories. In other words, each video has its own unique complexity. For videos having the same space complexity and the same time complexity, the videos have the same encoding complexity after being compressed through a video encoding algorithm. The encoding parameter and the video quality of the sample video in the sample video set may be annotated manually or automatically.

In some alternative implementations of this embodiment, the annotating an encoding parameter and a video quality of a sample video in the sample video set includes: encoding, for the sample video in the sample video set, the sample video according to a predetermined constant quality value, and annotating the encoding parameter and the video quality during the encoding. The videos having the same complexity (time and space) have the same encoding characteristic. For example, the videos encoded using the same CRF (e.g., CRF=23) have the same bit rate, and may have the same video quality at the same time.

The sample video in the sample video set may be encoded by respectively using discrete values (CRF=8, 10, 12 . . . 49), and then, the bit rates (bps) and the video qualities (e.g., PSNR, VMAF or MOS) generated after the encoding may be statisticized. In this way, the annotation work on all the sample videos is implemented. SI and TI may also be annotated.

Step 402, extracting, for the sample video in the sample video set, a feature of the sample video, and determining a complexity factor of the sample video according to the feature of the sample video.

In this embodiment, for each sample video in the sample video set, the sample video is decoded, to extract a feature of the video in the time domain or frequency domain. The feature may include motion information between adjacent frames, VIF (visual information fidelity), a DLM (detail loss measure), etc.

A complexity factor of the video may be determined according to the feature of the video, so as to classify the video. For each segment of the scene, CRF transcoding is performed according to a given constant quality value, and a mean BPP (bits per pixel, i.e., pixel depth) of all frames of the segment is statisticized after the transcoding. Then, a certain mathematical operation (e.g., Log 10) is performed on the value of the BPP, and the value is scaled to a certain range to be used as the complexity coefficient of the video. The mean value of the video complexity coefficients of all video segments in the video is statisticized as a mean complexity coefficient, and then the complexity factor of each video segment is calculated as follows.

Complexity factor=complexity coefficient/(mean complexity coefficient)

Step 403, classifying the sample video in the sample video set into at least one category according to the complexity factor.

In this embodiment, sample videos having the same complexity factor are divided into one category. A regression analysis is then performed on video qualities and encoding parameters of sample videos of each category, to determine a regression curve.

Step 404, performing, for a category of the at least one category, a regression on an encoding parameter and a video quality of a sample video belonging to the category, to obtain a relationship curve between the encoding parameter and the video quality.

Figure 5A:
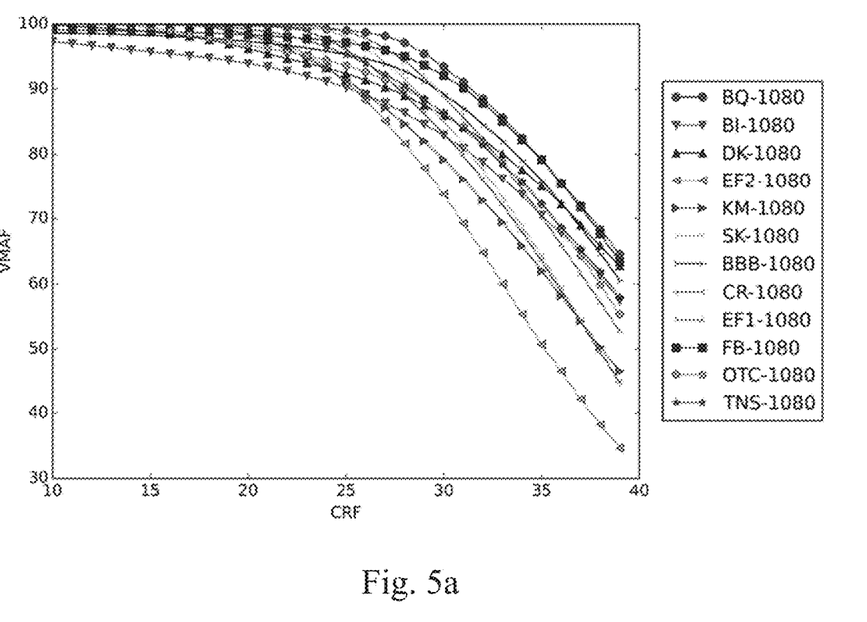
FIGS. 5*a* and 5*b* are relationship curves between encoding parameters and video qualities of the method for processing a video according to some embodiments of the present disclosure.
Figure 5B:
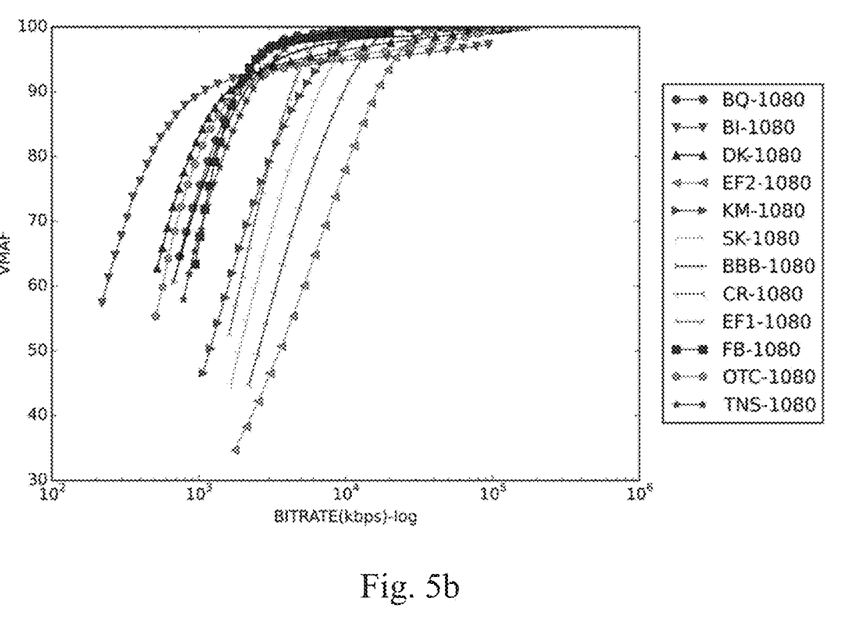

In this embodiment, curve fitting may be performed using a conventional regression method to obtain the relationship curve between the encoding parameter and the video quality. As shown in FIGS. 5a and 5b, the annotations on the right side are different video contents (BQ-1080, BI-1080, etc. representing different video sequences), and different video contents have different complexity factors. In other words, each complexity factor corresponds to a curve. The abscissa is the encoding parameter (CRF or bit rate), and the ordinate is the quality of the video VMAF.

It may be seen from FIG. 4 that, as compared with the embodiment corresponding to FIG. 2, the flow 400 of the method for processing a video in this embodiment reflects the step of training the encoding parameter prediction model. Accordingly, the scheme described in this embodiment may introduce data related to videos of video complexities of more categories. Thus, the more comprehensive video encoding parameter prediction is achieved.

Figure 6:
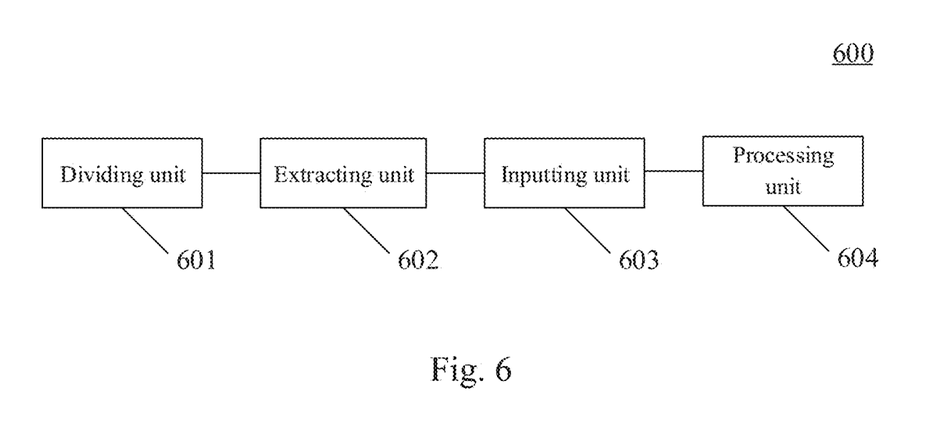
FIG. 6 is a schematic structural diagram of an apparatus for processing a video according to an embodiment of the present disclosure.

Further referring to FIG. 6, as an implementation of the method shown in the above drawings, an embodiment of the present disclosure provides an apparatus for processing a video. An embodiment of the apparatus may correspond to the embodiment of the method shown in FIG. 2, and the apparatus may be applied in various electronic devices.

As shown in FIG. 6, the apparatus 600 for processing a video in this embodiment includes: a dividing unit 601, an extracting unit 602, an inputting unit 603 and a processing unit 604. The dividing unit 601 is configured to acquire a to-be-processed video, and divide the video into at least one video segment according to a scene. The extracting unit 602 is configured to extract, for a video segment of the at least one video segment, a feature of the video segment. The inputting unit 603 is configured to input the feature and a target video quality into a pre-trained encoding parameter prediction model, to obtain an encoding parameter of the video segment, the encoding parameter prediction model being used to represent a corresponding relationship between the feature of the video segment and the encoding parameter under the target video quality. The processing unit 604 is configured to perform an encoding process on the video according to the encoding parameter corresponding to the video segment of the at least one video segment, to generate an encoded video.

In this embodiment, for specific processes of the dividing unit 601, the extracting unit 602, the inputting unit 603 and the processing unit 604 in the apparatus 600 for processing a video, and their technical effects, reference may be made to step 201, step 202, step 203 and step 204 in the corresponding embodiment of FIG. 2 respectively.

In some alternative implementations of this embodiment, the apparatus 600 further includes a verifying unit (not shown). The verifying unit is configured to: determine a video quality of the encoded video; and output, in response to the determined video quality not matching the target video quality, predetermined information.

In some alternative implementations of this embodiment, the extracting unit 602 is further configured to: decode the video segment, to extract a time domain feature and/or a frequency domain feature of the video segment.

In some alternative implementations of this embodiment, the apparatus 600 further includes a training unit (not shown). The training unit is configured to: acquire a sample video set, and annotate an encoding parameter and a video quality of a sample video in the sample video set; extract, for the sample video in the sample video set, a feature of the sample video, and determine a complexity factor of the sample video according to the feature of the sample video; classify the sample video in the sample video set into at least one category according to the complexity factor; and perform, for a category of the at least one category, a regression on an encoding parameter and a video quality of a sample video belonging to the category, to obtain a relationship curve between the encoding parameter and the video quality.

In some alternative implementations of this embodiment, the training unit is further configured to: encode, for the sample video in the sample video set, the sample video according to a predetermined constant quality value, and annotate the encoding parameter and the video quality during the encoding.

In some alternative implementations of this embodiment, the complexity factor is related to a pixel depth of the encoded sample video.

Figure 7:
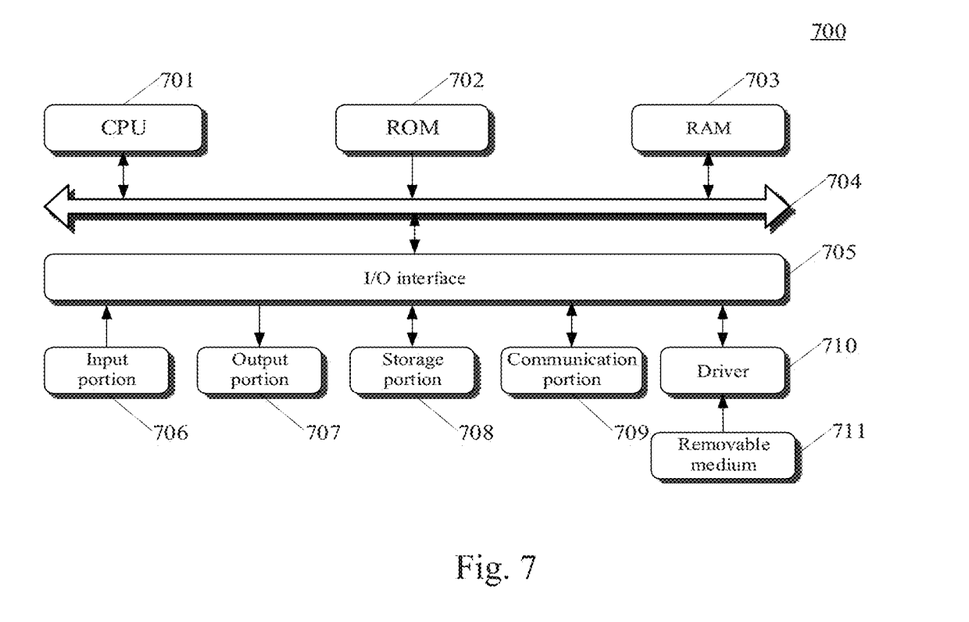
FIG. 7 is a schematic structural diagram of a computer system adapted to implement an electronic device according to embodiments of the present disclosure.

Referring to FIG. 7, FIG. 7 is a schematic structural diagram of a computer system 700 adapted to implement an electronic device (e.g., the server shown in FIG. 1) of some embodiments of the present disclosure. The electronic device shown in FIG. 7 is merely an example, and should not bring any limitations to the functions and the scope of use of some embodiments of the present disclosure.

As shown in FIG. 7, the computer system 700 includes a central processing unit (CPU) 701, which may execute various appropriate actions and processes in accordance with a program stored in a read-only memory (ROM) 702 or a program loaded into a random access memory (RAM) 703 from a storage portion 708. The RAM 703 also stores various programs and data required by operations of the system 700. The CPU 701, the ROM 702 and the RAM 703 are connected to each other through a bus 704. An input/output (I/O) interface 705 is also connected to the bus 704.

The following components are connected to the I/O interface 705: an input portion 706 including a keyboard, a mouse, etc.; an output portion 707 including a cathode ray tube (CRT), a liquid crystal display device (LCD), a speaker, etc.; a storage portion 708 including a hard disk or the like; and a communication portion 709 including a network interface card such as a LAN (local area network) card and a modem. The communication portion 709 performs communication processes via a network such as the Internet. A driver 710 is also connected to the I/O interface 705 as required. A removable medium 711 such as a magnetic disk, an optical disk, a magneto-optical disk, and a semiconductor memory may be installed on the driver 710, to facilitate the retrieval of a computer program from the removable medium 711, and the installation thereof on the storage portion 708 as needed.

In particular, according to some embodiments of the present disclosure, the process described above with reference to the flowchart may be implemented as a computer software program. For example, an embodiment of the present disclosure includes a computer program product, including a computer program hosted on a computer readable medium, the computer program including program codes for performing the method as illustrated in the flowchart. In such an embodiment, the computer program may be downloaded and installed from a network via the communication portion 709, and/or may be installed from the removable medium 711. The computer program, when executed by the central processing unit (CPU) 701, implements the above mentioned functionalities defined in the methods of some embodiments of the present disclosure. It should be noted that the computer readable medium in some embodiments of the present disclosure may be a computer readable signal medium, a computer readable storage medium, or any combination of the two. For example, the computer readable storage medium may be, but not limited to: an electronic, magnetic, optical, electromagnetic, infrared, or semiconductor system, apparatus, or element, or any combination of the above. A more specific example of the computer readable storage medium may include, but not limited to: an electrical connection having one or more wires, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any physical medium containing or storing programs, which may be used by a command execution system, apparatus or element or incorporated thereto. In some embodiments of the present disclosure, the computer readable signal medium may include a data signal that is propagated in a baseband or as apart of a carrier wave, which carries computer readable program codes. Such propagated data signal may be in various forms, including, but not limited to, an electromagnetic signal, an optical signal, or any suitable combination of the above. The computer readable signal medium may also be any computer readable medium other than the computer readable storage medium. The computer readable medium is capable of transmitting, propagating or transferring programs for use by, or used in combination with, the command execution system, apparatus or element. The program codes contained on the computer readable medium may be transmitted with any suitable medium including, but not limited to, wireless, wired, optical cable, RF medium, or any suitable combination of the above.

A computer program code for executing the operations according to some embodiments of the present disclosure may be written in one or more programming languages or a combination thereof. The programming language includes an object-oriented programming language such as Java, Smalltalk and C++, and further includes a general procedural programming language such as "C" language or a similar programming language. The program codes may be executed entirely on a user computer, executed partially on the user computer, executed as a standalone package, executed partially on the user computer and partially on a remote computer, or executed entirely on the remote computer or a server. When the remote computer is involved, the remote computer may be connected to the user computer through any type of network, including a local area network (LAN) or a wide area network (WAN), or be connected to an external computer (e.g., connected through Internet provided by an Internet service provider).

The flowcharts and block diagrams in the accompanying drawings illustrate architectures, functions and operations that may be implemented according to the system, the method, and the computer program product of the various embodiments of the present disclosure. In this regard, each of the blocks in the flowcharts or block diagrams may represent a module, a program segment, or a code portion, the module, the program segment, or the code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed substantially in parallel, or they may sometimes be executed in a reverse sequence, depending on the function involved. It should also be noted that each block in the block diagrams and/or flowcharts as well as a combination of blocks may be implemented using a dedicated hardware-based system executing specified functions or operations, or by a combination of dedicated hardware and computer instructions.

The units involved in some embodiments of the present disclosure may be implemented by means of software or hardware. The described units may also be provided in a processor. For example, the processor may be described as: a processor comprising a dividing unit, an extracting unit, an inputting unit and a processing unit. The names of these units do not in some cases constitute a limitation to such units themselves. For example, the dividing unit may alternatively be described as "a unit for acquiring a to-be-processed video, and dividing the video into at least one video segment according to a scene."

In another aspect, some embodiments of the present disclosure further provide a computer readable medium. The computer readable medium may be the computer readable medium included in the apparatus described in the above embodiments, or a stand-alone computer readable medium not assembled into the apparatus. The computer readable medium carries one or more programs. The one or more programs, when executed by the apparatus, cause the apparatus to: acquire a to-be-processed video, and divide the video into at least one video segment according to a scene; extract, for a video segment of the at least one video segment, a feature of the video segment; input the feature and a target video quality into a pre-trained encoding parameter prediction model, to obtain an encoding parameter of the video segment, the encoding parameter prediction model being used to represent a corresponding relationship between the feature of the video segment and the encoding parameter under the target video quality; and perform an encoding process on the video according to the encoding parameter corresponding to the video segment of the at least one video segment, to generate an encoded video.

The above description is only an explanation for embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the disclosure, for example, technical solutions formed by replacing the features as disclosed in the present disclosure with (but not limited to) technical features with similar functions.

What is claimed is:

1. A method for processing a video, comprising:
   acquiring a to-be-processed video, and dividing the video into at least one video segment according to a scene;
   for a video segment of the at least one video segment, extracting a feature of the video segment;
   inputting the feature and a target video quality into a pre-trained encoding parameter prediction model, to obtain an encoding parameter of the video segment, the encoding parameter prediction model being used to represent a corresponding relationship between the feature of the video segment and the encoding parameter under the target video quality; and
   performing an encoding process on the video according to the encoding parameter corresponding to the video segment of the at least one video segment, to generate an encoded video;
   wherein the encoding parameter prediction model is trained and obtained by:
   acquiring a sample video set, and annotating an encoding parameter and a video quality of a sample video in the sample video set;
   extracting, for the sample video in the sample video set, a feature of the sample video, and determining a complexity factor of the sample video according to the feature of the sample video;
   classifying the sample video in the sample video set into at least one category according to the complexity factor; and
   performing, for a category of the at least one category, a regression on the encoding parameter and the video quality of the sample video belonging to the category, to obtain a relationship curve between the encoding parameter and the video quality.

2. The method according to claim 1, further comprising:
   determining a video quality of the encoded video; and
   outputting, in response to the determined video quality not matching the target video quality, predetermined information.

3. The method according to claim 1, wherein the extracting a feature of the video segment includes:
   decoding the video segment, to extract a time domain feature and/or a frequency domain feature of the video segment.

4. The method according to claim 1, wherein the annotating an encoding parameter and a video quality of a sample video in the sample video set includes:
   encoding, for the sample video in the sample video set, the sample video according to a predetermined constant quality value, and annotating the encoding parameter and the video quality during the encoding.

5. The method according to claim 1, wherein the complexity factor is related to a pixel depth of the encoded sample video.

6. An apparatus for processing a video, comprising:
   at least one processor; and
   a memory storing instructions, the instructions when executed by the at least one processor, causing the at least one processor to perform operations, the operations comprising:
   acquiring a to-be-processed video, and divide the video into at least one video segment according to a scene;
   extracting, for a video segment of the at least one video segment, a feature of the video segment;

inputting the feature and a target video quality into a pre-trained encoding parameter prediction model, to obtain an encoding parameter of the video segment, the encoding parameter prediction model being used to represent a corresponding relationship between the feature of the video segment and the encoding parameter under the target video quality; and performing an encoding process on the video according to the encoding parameter corresponding to the video segment of the at least one video segment, to generate an encoded video;

wherein the encoding parameter prediction model is trained and obtained by:

acquiring a sample video set, and annotating an encoding parameter and a video quality of a sample video in the sample video set;

extracting, for the sample video in the sample video set, a feature of the sample video, and determining a complexity factor of the sample video according to the feature of the sample video;

classifying the sample video in the sample video set into at least one category according to the complexity factor; and     performing, for a category of the at least one category, a regression on encoding parameter and the video quality of the sample video belonging to the category, to obtain a relationship curve between the encoding parameter and the video quality.

7. The apparatus according to claim 6, the operations further comprising:

determining a video quality of the encoded video; and outputting, in response to the determined video quality not matching the target video quality, predetermined information.

8. The apparatus according to claim 6, wherein the extracting a feature of the video segment includes:

decoding the video segment, to extract a time domain feature and/or a frequency domain feature of the video segment.

9. The apparatus according to claim 6, wherein the annotating an encoding parameter and a video quality of a sample video in the sample video set includes:

encoding, for the sample video in the sample video set, the sample video according to a predetermined constant quality value, and annotating the encoding parameter and the video quality during the encoding.

10. The apparatus according to claim 6, wherein the complexity factor is related to a pixel depth of the encoded sample video.

11. A non-transitory computer readable medium, storing a computer program, wherein the computer program, when executed by a processor, causes the processor to perform operations, the operations comprising:

acquiring a to-be-processed video, and dividing the video into at least one video segment according to a scene;

for a video segment of the at least one video segment, extracting a feature of the video segment;

inputting the feature and a target video quality into a pre-trained encoding parameter prediction model, to obtain an encoding parameter of the video segment, the encoding parameter prediction model being used to represent a corresponding relationship between the feature of the video segment and the encoding parameter under the target video quality; and     performing an encoding process on the video according to the encoding parameter corresponding to the video segment of the at least one video segment, to generate an encoded video;

wherein the encoding parameter prediction model is trained and obtained by:

acquiring a sample video set, and annotating an encoding parameter and a video quality of a sample video in the sample video set;

extracting, for the sample video in the sample video set, a feature of the sample video, and determining a complexity factor of the sample video according to the feature of the sample video;

classifying the sample video in the sample video set into at least one category according to the complexity factor; and     performing, for a category of the at least one category, a regression on encoding parameter and video quality of sample video belonging to the category, to obtain a relationship curve between the encoding parameter and the video quality.

* * * * *